(12) United States Patent
Lee et al.

(10) Patent No.: US 9,955,491 B2
(45) Date of Patent: Apr. 24, 2018

(54) METHOD AND APPARATUS FOR INITIAL ACCESS IN MOBILE COMMUNICATION SYSTEM

(71) Applicant: ELECTRONICS AND TELECOMMUNICATIONS RESEARCH INSTITUTE, Daejeon (KR)

(72) Inventors: Namsuk Lee, Daejeon (KR); Yong Seouk Choi, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 224 days.

(21) Appl. No.: 14/982,156

(22) Filed: Dec. 29, 2015

(65) Prior Publication Data

US 2016/0192358 A1  Jun. 30, 2016

(30) Foreign Application Priority Data

Dec. 30, 2014  (KR) ........................ 10-2014-0194136
Apr. 28, 2015  (KR) ........................ 10-2015-0059957

(51) Int. Cl.
*H04W 72/10* (2009.01)
*H04W 74/00* (2009.01)

(52) U.S. Cl.
CPC ......... *H04W 72/10* (2013.01); *H04W 74/006* (2013.01)

(58) Field of Classification Search
CPC ............................ H04W 72/10; H04W 74/006
See application file for complete search history.

(56) References Cited

U.S. PATENT DOCUMENTS

| 2009/0170514 | A1* | 7/2009 | Yokoyama | .......... | H04W 72/085 |
| | | | | | 455/436 |
| 2012/0263067 | A1 | 10/2012 | Kim et al. | | |
| 2013/0021979 | A1 | 1/2013 | Kwon et al. | | |
| 2013/0022023 | A1 | 1/2013 | Aydin | | |
| 2013/0165126 | A1 | 6/2013 | Wei | | |
| 2014/0073337 | A1 | 3/2014 | Hong et al. | | |
| 2014/0120926 | A1* | 5/2014 | Shin | ...................... | H04W 56/00 |
| | | | | | 455/450 |
| 2014/0334445 | A1 | 11/2014 | Wei | | |
| 2014/0373124 | A1* | 12/2014 | Rubin | ..................... | H04L 67/28 |
| | | | | | 726/7 |
| 2017/0272204 | A1* | 9/2017 | Nishio | .................. | H04L 1/0026 |

FOREIGN PATENT DOCUMENTS

| KR | 10-2011-0083455 A | 7/2011 |
| KR | 10-2011-0108536 A | 10/2011 |
| KR | 10-2013-0003016 A | 1/2013 |
| KR | 10-2013-0045365 A | 5/2013 |

OTHER PUBLICATIONS

Namsuk Lee et al., "A Beam Switching Method for Mobile Broadband System Using Millimeter Wave Frequency", Summer Conference of Korea Information and Communications Society, p. 1002-1003, Jun. 2014, English abstract.

* cited by examiner

*Primary Examiner* — Albert T Chou
(74) *Attorney, Agent, or Firm* — Rabin & Berdo, P.C.

(57) ABSTRACT

A terminal receives access priority information on a plurality of sub-beams configuring a beam from a base station, selects one of a plurality of beams, and selects one of a plurality of sub-beams of the selected beam on the basis of the access priority information to perform a random access.

15 Claims, 6 Drawing Sheets

METHOD AND APPARATUS FOR INITIAL ACCESS IN MOBILE COMMUNICATION SYSTEM

CROSS-REFERENCE TO RELATED APPLICATION

This application claims priority to and the benefit of Korean Patent Application Nos. 10-2014-0194136 and 10-2015-0059957 filed in the Korean Intellectual Property Office on Dec. 30, 2014 and Apr. 28, 2015, the entire contents of which are incorporated herein by reference.

BACKGROUND OF THE INVENTION (a) Field of the Invention

The present invention relates to a method and an apparatus for initial access in a mobile communication system. More particularly, the present invention relates to a method and an apparatus for initial access in a millimeter-wave-based mobile communication system.

(b) Description of the Related Art

Currently, a fourth-generation (4G) mobile communication system may support a data transmission capacity up to 1 Gbps using a carrier aggregation technology in a plurality of frequency bands of less than 6 GHz. In the carrier aggregation technology, the plurality of frequency bands may be divided into a plurality of carrier components (CCs), and data may be simultaneously transmitted using the plurality of CCs, such that data transmission capability may be increased.

A terminal performs initial access using one of the plurality of CCs to set up connection with a base station. This CC becomes a primary carrier component (PCC). The terminal may have one PCC and a plurality of secondary carrier components (SCCs). The terminal uses the PCC to transmit and receive control messages and transmit control signals such as a scheduling request to an uplink, hybrid automatic repeat request (HARQ) feedback, channel quality indicator (CQI) feedback, and the like. In the case of intending to change the PCC, a handover procedure is used.

A millimeter wave (of 6 GHz or more) based mobile communication system uses a wider frequency band in a high frequency band. In addition, the millimeter-wave-based mobile communication system uses a beamforming technology due to frequency characteristics such as a very strong straight propagation feature.

In consideration of the straight propagation feature of the millimeter wave frequency, one cell consists of a plurality of beams, each of which supports a service using an entire frequency bandwidth of the base station. In this environment, since a frequency bandwidth of each beam is wide, the frequency bandwidth of each beam is divided into frequency allocations (FA) of a plurality of small frequency bandwidths, and a service is performed using each FA as a sub-beam (SB). That is, the base station consists of a plurality of beams, each of which is divided into a plurality of SBs.

In the millimeter-wave-based mobile communication system as described above, the terminal selects a beam having the best signal in initial access process for setting up connection with the base station, and selects any of the plurality of SBs in the selected beam to perform initial access to the base station. The SB performing the initial access to have connection with the base station may become a primary sub-beam, and the base station may allocate a plurality of secondary sub-beams to the terminal after the initial access procedure is successfully performed. Therefore, it is required for the base station to dispose the terminal well between the plurality of SBs to increase efficient utilization of resources.

In the existing carrier aggregation technology, in the case of intending to change the PCC, a handover procedure is used. Since this is performed after the terminal arbitrarily selects the primary sub-beam (PSB) to perform the initial access procedure and is allocated with a dedicated resource of the PSB, complexity of a signal and a service delay may be generated. Particularly, since the millimeter-wave-based mobile communication system divides the wide bandwidth into the plurality of SBs and the terminal selects any of the plurality of SBs to perform the initial access procedure, a problem that accesses of the terminal are concentrated on a specific SB may occur.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and an apparatus for initial access in a mobile communication system having advantages of effectively controlling selection of a sub-beam and resource allocation of the sub-beam for initial access of a terminal in a millimeter-wave-based mobile communication system.

An exemplary embodiment of the present invention provides a method for initial access of a terminal. The method for initial access includes: selecting one of a plurality of beams; receiving access priority information on a plurality of sub-beams configuring the beam from a base station; selecting one of the plurality of sub-beams of the selected beam on the basis of the access priority information; and setting up the selected sub-beam as a primary sub-beam to perform a random access.

The receiving may include receiving a system information block (SIB) type 1 in any selected sub-beam of the plurality of sub-beams of the selected beam, and the SIB type 1 may include the access priority information.

The method for initial access may further include: receiving a change instruction of the primary sub-beam from the base station; and changing the primary sub-beam into another sub-beam depending on the change instruction.

The receiving of the change instruction of the primary sub-beam may include: transmitting a radio resource control (RRC) connection request message to the base station in the selected sub-beam; and receiving an RRC connection setup message including index information of a sub-beam that is to be used as the primary sub-beam and radio resource allocation information in the primary sub-beam.

The selecting of the one beam may include: measuring quality of signals received in the plurality of beams; and selecting a beam having the best quality of the signal on the basis of a measurement result.

The method for initial access may further include: transmitting an RRC connection request message to the base station in the selected sub-beam; and receiving an RRC connection setup message including radio resource allocation information in the selected beam.

Another exemplary embodiment of the present invention provides a method for initial access of a terminal in a base station operating a plurality of beams. The method for initial access includes: setting up each of a plurality of sub-beams configuring a beam to primary sub-beams to measure the number of terminals that are being served and an utilization rate of resources; calculating access priorities for the plurality of sub-beams on the basis of a measurement result; transmitting the access priorities to the plurality of sub-beams, respectively; receiving a preamble for a random access in a sub-beam selected by the terminal on the basis of the access priorities; and transmitting a response to the preamble to the terminal.

The method for initial access may further include: receiving an RRC connection request message in the sub-beam selected by the terminal; determining whether or not to set up the sub-beam in which the RRC connection request message is received to a primary sub-beam of the terminal; and transmitting an RRC connection setup message including radio resource allocation information in the primary sub-beam to the terminal.

The transmitting of the RRC connection setup message may include adding index information of a sub-beam that is to be used as the primary sub-beam to the RRC connection setup message in the case in which the terminal determines that the primary sub-beam is changed into another sub-beam.

The calculating may include setting up the access priorities to be high in a sequence of sub-beams in which the number of terminals and the utilization rate of resources are low.

Yet another exemplary embodiment of the present invention provides an apparatus for initial access of a terminal. The apparatus for initial access includes a transceiver and a processor. The transceiver receives access priority information on a plurality of sub-beams configuring each beam from a base station. The processor selects one beam on the basis of quality of signals received in a plurality of beams, selects one sub-beam that is to be used as a primary sub-beam among a plurality of sub-beams of the one selected beam on the basis of the access priority information, and performs a random access through the selected sub-beam.

The access priority information may be calculated on the basis of the number of terminals that are being served and a utilization rate of resources by setting up the respective sub-beams to primary sub-beams by the base station, and the transceiver may receive a system information block (SIB) type 1 including the access priority information through any of a plurality of sub-beams of the selected beam.

The processor may change the primary sub-beam depending on a change instruction of the primary sub-beam from the base station.

The transceiver may receive an RRC connection setup message including index information of a sub-beam that is to be used as the primary sub-beam and radio resource allocation information in the primary sub-beam, and the processor may change the primary sub-beam on the basis of the index information of the sub-beam that is to be used as the primary sub-beam.

The processor may perform an RRC connection request to the base station in the selected sub-beam, determine that the selected sub-beam is the primary sub-beam depending on an RRC connection setup message received from the base station through the transceiver, and set up radio resources, and the RRC connection setup message may include radio resource allocation information in the selected sub-beam.

DETAILED DESCRIPTION OF THE EMBODIMENTS

Figure 1:
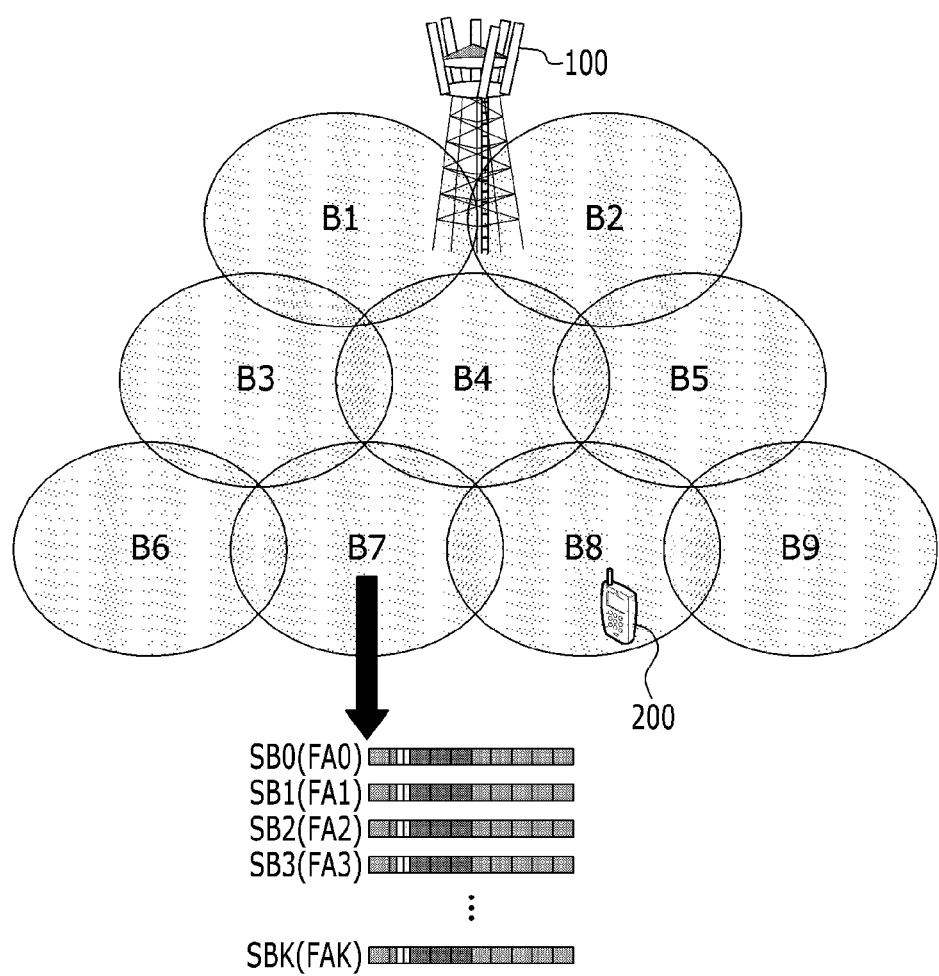
FIG. 1 is a view showing one cell configuration in a millimeter-wave-based mobile communication system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the present specification and the claims, unless explicitly described to the contrary, the word "comprise" and variations such as "comprises" or "comprising" will be understood to imply the inclusion of stated elements but not the exclusion of any other elements.

Throughout the present specification, a terminal may indicate a mobile terminal (MT), a mobile station (MS), an advanced mobile station (AMS), a high reliability mobile station (HR-MS), a subscriber station (SS), a portable subscriber station (PSS), an access terminal (AT), user equipment (UE), or the like, and may include all or some of functions of the MT, the MS, the AMS, the HR-MS, the SS, the PSS, the AT, the UE, or the like.

In addition, a base station (BS) may indicate an advanced base station (ABS), a high reliability base station (HR-BS), a node B, an evolved node B, (eNodeB), an access point (AP), a radio access station (RAS), a base transceiver station (BTS), a mobile multihop relay (MMR)-BS, a relay station (RS) serving as the base station, a relay node (RN) serving as the base station, an advanced relay station (ARS) serving as the base station, a high reliability relay station (HR-RS) serving as the base station, small base stations [femto base station (femto BS), a home node B (HNB), a home eNodeB (HeNB), a pico base station (pico BS), a metro base station (metro BS), a micro base station (micro BS), and the like], or the like, and may include all or some of functions of the ABS, the node B, the eNodeB, the AP, the RAS, the BTS, the MMR-BS, the RS, the RN, the ARS, the HR-RS, the small base stations, or the like.

Next, a method and an apparatus for initial access in a mobile communication system according to an exemplary embodiment of the present invention will be described in detail with reference to the accompanying drawings.

FIG. 1 is a view showing one cell configuration in a millimeter-wave-based mobile communication system according to an exemplary embodiment of the present invention.

Referring to FIG. 1, the millimeter-wave-based mobile communication system includes a base station 100 and a terminal 200.

The base station 100 operates multiple beams B1 to B9 within a cell. The multiple beams B1 to B9 each have unique identifiers, and partial regions of the respective beams B1 to B9 may be overlapped with those of beams adjacent thereto.

The base station 100 may use a millimeter wave (of 10 GH or more) frequency band in order to communicate with the terminal 200, and the respective beams B1 to B9 have a service radius of several tens of meters and may use a bandwidth of 1 GHz. In addition, each beam divides an entire frequency band into a plurality of frequency allocations FA0 to FAK, and performs a service using the respective FAs FA0 to FAK as sub-beams SB0 to SBK. That is, the respective beams B1 to B9 may include a plurality of sub-beams SB0 to SBK.

The terminal 200 performs initial access for setting up connection with the base station 100.

The terminal 200 selects a beam having the best signal among the multiple beams B1 to B9 in initial access process, and selects any of the plurality of sub-beams within the selected beam to perform the initial access to the base station. The sub-beam having connection with the base station 100 through the initial access becomes a primary sub-beam (PSB).

After the initial access procedure is successfully performed, the base station 100 may allocate a plurality of secondary sub-beams (SSBs) to the terminal.

The terminal 200 performs control message transmission and reception, downlink control information reception, an uplink scheduling request, and channel quality indicator (CQI) feedback and hybrid automatic repeat request (HARQ) feedback transmission using the PSB.

Figure 2:
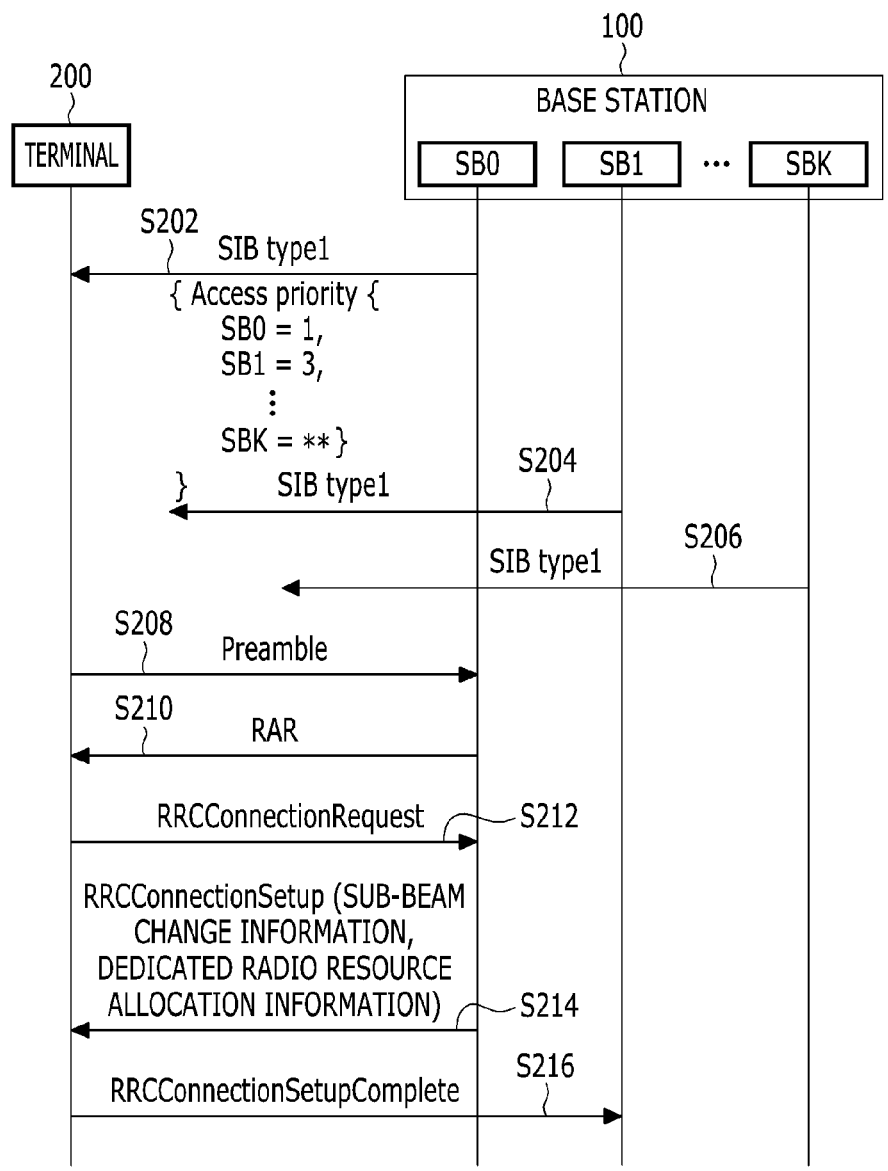
FIG. 2 is a view showing initial access procedure of a terminal according to an exemplary embodiment of the present invention.

FIG. 2 is a view showing initial access procedure of a terminal according to an exemplary embodiment of the present invention.

Referring to FIG. 2, the base station 100 determines access priorities for the respective sub-beams on the basis of the number of terminals that are being served by the respective sub-beams and an amount of uplink traffic. That is, the base station 100 may measure the number of terminals that are being served as the PSB in the respective sub-beams and utilization rates of uplink control channels and uplink shared channels, and may determine access priorities for the respective sub-beams on the basis of them.

The base station 100 allows information on the determined access priorities of the respective sub-beams to be included in a system information block (SIB) type 1, and broadcasts the SIB type 1 including the information on the determined access priorities in all sub-beams.

The base station 100 may periodically determine the access priorities for the respective sub-beams, and broadcast information on changed access priorities of the respective sub-beams in all sub-beams through the SIB type 1.

The terminal 200 determines a sub-beam that is to access the base station 100 as the PSB using the information on the access priorities of the respective sub-beams obtained through the SIB type 1, and performs the initial access process through the determined sub-beam. The base station 100 determines whether or not to set up the sub-beam that the terminal 200 accesses to the PSB when the terminal 200 performs the initial access. In the case in which the base station 100 intends to change the PSB of the terminal 200 into another sub-beam in the initial access process, a change procedure is performed.

In detail, the terminal 200 receives the SIB type 1 to search the access priorities of the respective SBs. Any of the sub-beams having high priorities is selected, and a random access procedure is performed in the selected sub-beam. In FIG. 2, a case in which the sub-beam SB0 is selected is shown for convenience.

For the purpose of the random access procedure, the terminal 200 transmits a preamble to the selected sub-beam SB0 (S208), and receives a random access response (RAR), which is a response to the preamble from the base station 100 (S210).

Through the above-mentioned process, when the random access procedure is successfully completed, the terminal 200 transmits a radio resource control (RRC) connection request message RRCCConnectionRequest to the base station 100 in the selected sub-beam SB0 (S212).

The base station 100 determines whether or not to set up the sub-beam SB0 that the terminal 200 currently accesses to the PSB of the terminal 200.

When the base station 100 determines that the sub-beam SB0 that the terminal 200 currently accesses is the PSB of the terminal 200, the base station 100 allocates dedicated radio resources that are to be used by the terminal 200 in the current sub-beam SB0, and transmits an RRC connection setup message RRCConnectionSetup including dedicated radio resource allocation information to the terminal 200 (S214).

When the base station 100 determines that a sub-beam different from the sub-beam SB0 that the terminal 200 currently accesses is set up to the PSB of the terminal 200, the base station 100 determines the sub-beam that is to be used as the PSB, and allocates dedicated radio resources that are to be used in the PSB. In addition, the base station 100 transmits an RRC connection setup message RRCConnectionSetup including sub-beam change information and radio resource allocation information that is to be used in the PSB to the terminal 200 (S214). Here, the sub-beam change information may include index information of the sub-beam that is to be used as the PSB. That is, the index information of the sub-beam that is to be used as the PSB is set up in the RRC connection setup message RRCConnectionSetup, thereby making it possible to instruct the terminal 200 to change the sub-beam.

When the terminal 200 receives the RRC connection setup message RRCConnectionSetup, it sets the dedicated radio resources allocated to the PSB, and transmits an RRC connection setup complete message RRCConnectionSetupComplete to the base station 100 in the PSB (S216).

For example, in the case in which index information of the sub-beam SB1 is included as the sub-beam change information in the RRC connection setup message RRCConnectionSetup, the terminal 200 may determine that the sub-beam SB1 is the PSB, and set up the dedicated radio resources. In addition, the terminal 200 transmits the RRC connection setup complete message RRCConnectionSetupComplete to the base station 100 in the sub-beam SB1 (S216).

Figure 3:
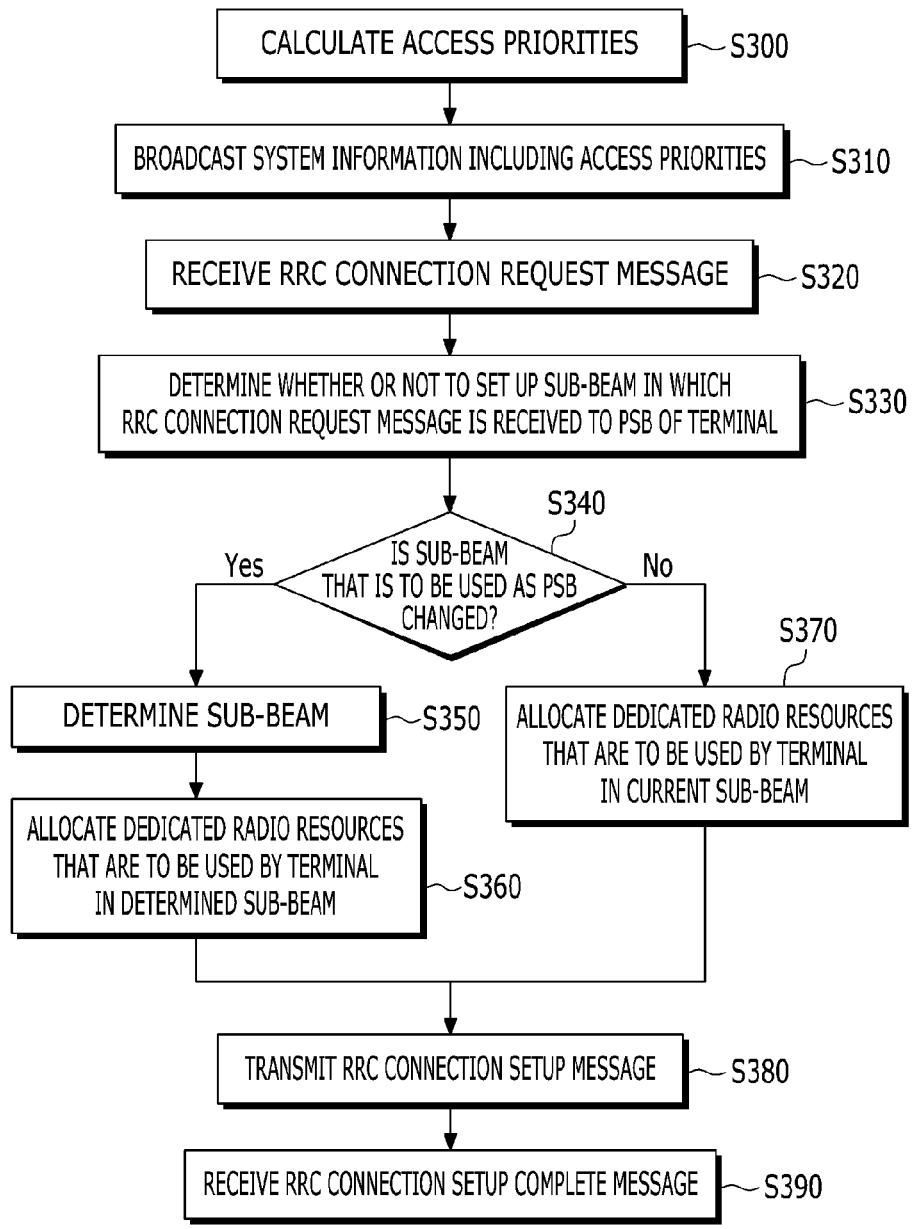
FIG. 3 is a flowchart showing a procedure for uniformly distributing primary sub-beams (PSBs) of the terminals to the respective sub-beams in a base station according to an exemplary embodiment of the present invention.

FIG. 3 is a flowchart showing a procedure for uniformly distributing primary sub-beams (PSBs) of the terminals to the respective sub-beams in a base station according to an exemplary embodiment of the present invention.

Referring to FIG. 3, the base station 100 measures the number of terminals that are being served as the current PSB in each SB, and measures a utilization rate of uplink control channels allocated for these terminals and a utilization rate of uplink shared channels used for data transmission to calculate the access priorities of the respective SBs (S300).

Information on the access priorities of the respective SBs is periodically measured and updated. The base station 100 may calculate the PSBs of the terminals in the respective sub-beams so that the PSBs of the terminals may be uniformly distributed in the respective sub-beams. For example, the base station 100 may set up the access priorities to be high in a sequence in which the number of terminals that are being served as the current PSB, the utilization rate of the uplink control channels, and the utilization rate of the uplink shared channels are low.

The base station 100 allows the information on the access priorities of the respective SBs to be included in the SIB type 1, and broadcasts the SIB type 1 including the information on the access priorities in all the SBs (S310).

When the base station 100 receives the RRC connection request message RRCConnectionRequest from the terminal 200 (S320), the base station 100 determines whether or not to set up the sub-beam in which the RRC connection request message RRCConnectionRequest is received to the PSB of the terminal 200 (S330).

When the base station 100 intends to change the PSR into a sub-beam different from the sub-beam in which the RRC connection request message RRCConnectionRequest is received into the PSB (S340), the base station 100 determines the sub-beam that is to be used as the PSB (S350).

The base station 100 allocates dedicated radio resources that are to be used by the terminal 200 in the determined sub-beam (S360).

The base station 100 allows the index information of the determined sub-beam and the dedicated radio resource allocation information to be included in the RRC connection setup message RRCConnectionSetup, and transmits the RRC connection setup message RRCConnectionSetup including the index information of the determined sub-beam and the dedicated radio resource allocation information to the terminal 200 (S380).

Meanwhile, when the base station 100 determines that the sub-beam in which the RRC connection request message RRCConnectionRequest is received is the PSB of the terminal 200, the base station 100 allocates the dedicated radio resources that are to be used by the terminal 200 in this sub-beam (S370), and allows the dedicated radio resource allocation information to be included in the RRC connection setup message RRCConnectionSetup and transmits the RRC connection setup message RRCConnectionSetup including the dedicated radio resource allocation information to the terminal 200 (S380). Here, the RRC connection setup message RRCConnectionSetup is transmitted through the sub-beam included in the RRC connection request message RRCConnectionRequest.

In addition, when the RRC connection setup complete message RRCConnectionSetupComplete is received through the PSB of the terminal 200 (S390), the base station 100 determines that the setup of the PSB for the terminal 200 is completed.

Figure 4:
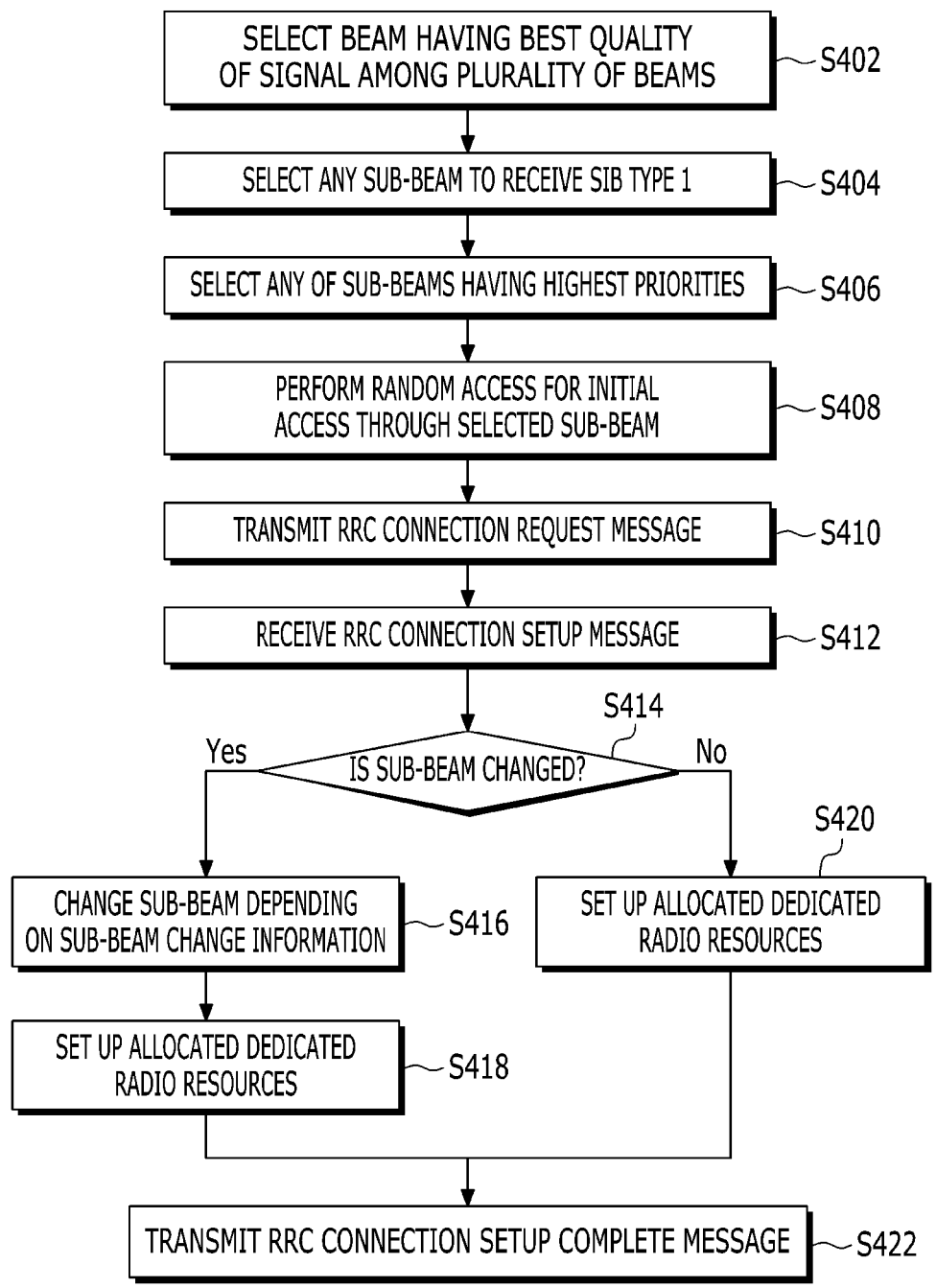
FIG. 4 is a flowchart showing the initial access procedure of the terminal according to an exemplary embodiment of the present invention.

FIG. 4 is a flowchart showing the initial access procedure of the terminal according to an exemplary embodiment of the present invention.

Referring to FIG. 4, the base station 100 sets up a plurality of beams in a coverage area thereof, and transmits signals in each of the plurality of beam areas.

The terminal 200 measures quality of the signals received in the plurality of beams of the base station 100, and selects a beam having the best quality of signal on the basis of a measurement result (S402).

The terminal 200 selects any of a plurality of sub-beams in the selected beam, and receives the SIB type 1 broadcast by the base station 100 in the selected sub-beam (S404).

The terminal 200 confirms the access priorities of the respective sub-beams through the received SIB type 1, and selects any one of a predetermined number of sub-beams having the highest access priorities on the basis of the access priorities of the respective sub-beams (S406).

The terminal 200 performs the random access for the initial access through the selected sub-beam (S408).

When the random access is successfully performed, the terminal 200 transmits the RRC connection request message RRCConnectionRequest to the base station 100 (S410).

Next, the terminal 200 receives the RRC connection setup message RRCConnectionSetup from the base station 100 (S412), and determines whether or not the sub-beam that is to be set up to the PSB through the sub-beam change information included in the RRC connection setup message RRCConnectionSetup (S414) is changed.

In the case in which the sub-beam change information is included in the RRC connection setup message RRCConnectionSetup, the terminal 200 changes the sub-beam depending on the sub-beam change information (S416), and determines that the changed sub-beam is the PSB.

The terminal 200 sets up the dedicated radio resources that are to be used in the PSB determined on the basis of the dedicated radio resource allocation information included in the RRC connection setup message RRCConnectionSetup (S418).

Meanwhile, in the case in which the sub-beam change information is not present in the RRC connection setup message RRCConnectionSetup, the terminal 200 determines that the sub-beam that has already been selected is the PSB, and sets up the dedicated radio resources that are to be used in the PSB determined on the basis of the dedicated radio resource allocation information included in the RRC connection setup message RRCConnectionSetup (S420).

The terminal 200 transmits the RRC connection setup complete message RRCConnectionSetupComplete to the base station using the dedicated radio resource information of the setup PSB (S422).

Figure 5:
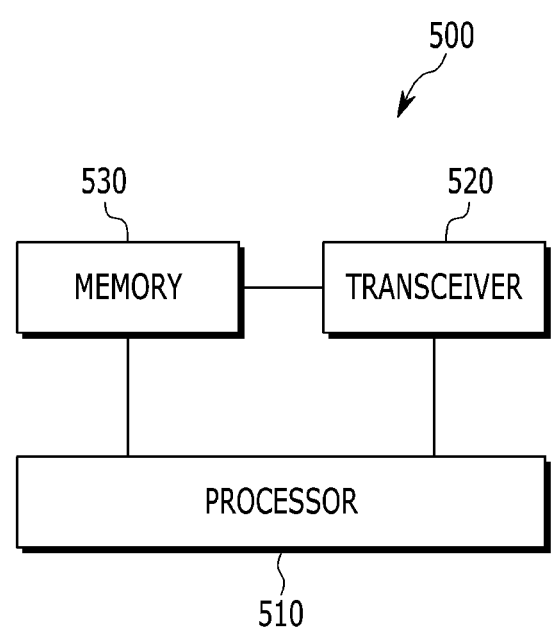
FIG. 5 is a view showing a base station according to an exemplary embodiment of the present invention.

FIG. 5 is a view showing a base station according to an exemplary embodiment of the present invention.

Referring to FIG. 5, an apparatus 500 for initial access of the base station 100 includes a processor 510, a transceiver 520, and a memory 530.

The processor 510 performs the procedures described with reference to FIG. 3 to perform the initial access procedure of the terminal 200. The processor 510 measures the number of terminals that are serving as the current PSB in each SB, and measures the utilization rate of the uplink control channels allocated for these terminals and the utilization rate of the uplink shared channels used for data transmission to calculate the access priorities of the respective SBs and generate the SIB type 1 including the information on the access priorities of the respective SBs. In addition, the processor 510 determines whether or not to set up the determined sub-beam of the terminal 200 to the PSB of the terminal 200, and instructs the terminal 200 to change the sub-beam in the case of intending to change the PSB of the terminal 200 into another sub-beam.

The transceiver 520 periodically broadcasts the SIB type 1, and transmits and receives the messages described with reference to FIG. 3.

The memory 530 stores instructions that are to be executed in the processor 510 therein or loads instructions from a storage device (not shown) and temporarily stores the loaded instructions therein, and the processor 510 executes the instructions stored or loaded in the memory 530.

The processor 510 and the memory 530 are connected to each other through a bus (not shown), and input and output interfaces (not shown) may also be connected to the bus. Here, the transceiver 520 may be connected to the input and output interfaces, and peripheral devices such as an input device, a display, a speaker, a storage device, and the like, may be connected to the input and output interfaces.

Figure 6:
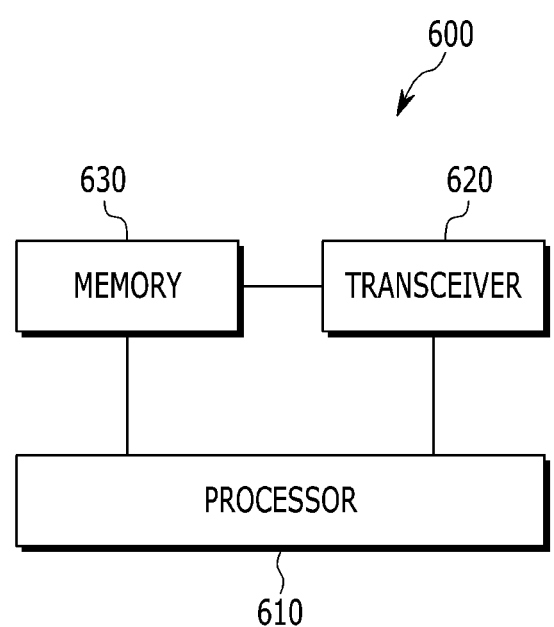
FIG. 6 is a view showing the terminal according to an exemplary embodiment of the present invention.

FIG. 6 is a view showing the terminal according to an exemplary embodiment of the present invention.

Referring to FIG. 6, an apparatus 600 for initial access of the terminal 200 includes a processor 610, a transceiver 620, and a memory 630.

The processor 610 performs the procedures described with reference to FIG. 4 to perform the initial access procedure of the terminal 200. The processor 610 measures the quality of the signals received in the plurality of beams, and selects the beam having the best quality of the signal on the basis of the measurement result. The processor 610 selects any of the plurality of sub-beams present in the selected beam, and confirms the access priorities of the respective sub-beams through the received SIB type 1 in the selected sub-beam. The processor 610 selects any one of a predetermined number of sub-beams having the highest access priorities on the basis of the access priorities of the respective sub-beams to perform the random access procedure. In addition, the processor 610 determines that the selected sub-beam or the sub-beam determined in the base station 100 is the PSB, and sets up the dedicated radio resources.

The transceiver 620 receives the SIB type 1 in the sub-beam selected in the processor 610. In addition, the transceiver 620 may transmit and receive the messages described with reference to FIG. 4 through the PSB.

The memory 630 stores instructions that are to be executed in the processor 610 therein or loads instructions from a storage device (not shown) and temporarily stores the loaded instructions therein, and the processor 610 executes the instructions stored or loaded in the memory 630.

The processor 610 and the memory 630 are connected to each other through a bus (not shown), and input and output interfaces (not shown) may also be connected to the bus. Here, the transceiver 620 may be connected to the input and output interfaces, and peripheral devices such as an input device, a display, a speaker, a storage device, and the like may be connected to the input and output interfaces.

According to an exemplary embodiment of the present invention, selection of a sub-beam and resource allocation of the sub-beam for initial access of a terminal in a millimeter-wave-based mobile communication system may be effectively controlled.

The exemplary embodiments of the present invention described above are not implemented only through the apparatus and/or the method described above, but may also be implemented through programs executing functions corresponding to configurations of the exemplary embodiments of the present invention, a recording medium in which the programs are recorded, and the like. In addition, these implementations may be easily made by those skilled in the art to which the present invention pertains from the exemplary embodiments described above.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for initial access of a terminal, comprising:
   selecting one of a plurality of beams;
   receiving access priority information on a plurality of sub-beams configuring the selected beam from a base station;
   selecting one of the plurality of sub-beams of the selected beam on the basis of the access priority information; and
   setting up the selected sub-beam as a primary sub-beam to perform a random access;
   wherein the access priority information includes respective access priorities of the plurality of sub-beams, the respective access priorities being based on a number of terminals being served and a utilization rate of associated resources including uplink control channels and uplink shared channels.

2. The method for initial access of claim 1, wherein the receiving includes receiving a system information block (SIB) type 1 in any selected sub-beam of the plurality of sub-beams of the selected beam, and the SIB type 1 includes the access priority information.

3. The method for initial access of claim 1, further comprising:
   receiving a change instruction of the primary sub-beam from the base station; and
   changing the primary sub-beam into another sub-beam depending on the change instruction.

4. The method for initial access of claim 3, wherein the receiving of the change instruction of the primary sub-beam includes:
   transmitting a radio resource control (RRC) connection request message to the base station in the selected sub-beam; and
   receiving an RRC connection setup message including index information of a sub-beam that is to be used as the primary sub-beam and radio resource allocation information in the primary sub-beam.

5. The method for initial access of claim 1, wherein the selecting of the one beam includes:
   measuring quality of signals received in the plurality of beams; and
   selecting a beam having the best quality of the signal on the basis of a measurement result.

6. The method for initial access of claim 1, further comprising:
   transmitting an RRC connection request message to the base station in the selected sub-beam; and
   receiving an RRC connection setup message including radio resource allocation information in the selected beam.

7. A method for initial access of a terminal in a base station operating a plurality of beams, comprising:
   setting up each of a plurality of sub-beams configuring a beam to primary sub-beams to measure a number of terminals that are being served and a utilization rate of resources;
   calculating access priorities for the plurality of sub-beams on the basis of the number of terminals and the utilization rate of resources measured;
   transmitting the access priorities to the plurality of sub-beams, respectively;

receiving a preamble for a random access in a sub-beam selected by the terminal on the basis of the access priorities; and transmitting a response to the preamble to the terminal.

8. The method for initial access of claim 7, further comprising:

receiving an RRC connection request message in the sub-beam selected by the terminal;

determining whether or not to set up the sub-beam in which the RRC connection request message is received to a primary sub-beam of the terminal; and transmitting an RRC connection setup message including radio resource allocation information in the primary sub-beam to the terminal.

9. The method for initial access of claim 8, wherein the transmitting of the RRC connection setup message includes adding index information of a sub-beam that is to be used as the primary sub-beam to the RRC connection setup message in the case in which the terminal determines that the primary sub-beam is changed into another sub-beam.

10. The method for initial access of claim 7, wherein the calculating includes setting up the access priorities to be high in a sequence of sub-beams in which the number of terminals and the utilization rate of resources are low.

11. An apparatus for initial access of a terminal, comprising:

a transceiver receiving access priority information on a plurality of sub-beams configuring each beam from a base station; and a processor selecting one beam on the basis of quality of signals received in a plurality of beams, selecting one sub-beam that is to be used as a primary sub-beam among a plurality of sub-beams of the selected one beam on the basis of the access priority information, and performing a random access through the selected sub-beam;

wherein the access priority information includes respective access priorities of the plurality of sub-beams, the respective access priorities being based on a number of terminals being served and a utilization rate of associated resources including uplink control channels and uplink shared channels.

12. The apparatus for initial access of claim 11, wherein the transceiver receives a system information block (SIB) type 1 including the access priority information through any of a plurality of sub-beams of the selected beam.

13. The apparatus for initial access of claim 11, wherein the processor changes the primary sub-beam depending on a change instruction of the primary sub-beam from the base station.

14. The apparatus for initial access of claim 13, wherein the transceiver receives an RRC connection setup message including index information of a sub-beam that is to be used as the primary sub-beam and radio resource allocation information in the primary sub-beam, and the processor changes the primary sub-beam on the basis of the index information of the sub-beam that is to be used as the primary sub-beam.

15. The apparatus for initial access of claim 11, wherein the processor performs an RRC connection request to the base station in the selected sub-beam, determines that the selected sub-beam is the primary sub-beam depending on an RRC connection setup message received from the base station through the transceiver, and sets up radio resources, and the RRC connection setup message includes radio resource allocation information in the selected sub-beam.

* * * * *